(12) United States Patent
Feng et al.

(10) Patent No.: US 11,698,286 B2
(45) Date of Patent: Jul. 11, 2023

(54) SENSING AND CONTROL DEVICE AND METHOD FOR A WEIGHT MEASUREMENT DEVICE

(71) Applicant: KONINKLIJKE PHILIPS N.V., Eindhoven (NL)

(72) Inventors: Hai Tao Feng, Shanghai (CN); Zhongchi Luo, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 758 days.

(21) Appl. No.: 16/496,981

(22) PCT Filed: Mar. 28, 2018

(86) PCT No.: PCT/EP2018/057925
§ 371 (c)(1),
(2) Date: Sep. 24, 2019

(87) PCT Pub. No.: WO2018/178155
PCT Pub. Date: Oct. 4, 2018

(65) Prior Publication Data
US 2020/0033184 A1    Jan. 30, 2020

(30) Foreign Application Priority Data

Apr. 1, 2017    (WO) ................ PCT/CN2017/000276
May 10, 2017   (EP) ..................................... 17170406

(51) Int. Cl.
*G01G 23/16* (2006.01)
*A47J 36/32* (2006.01)
(Continued)

(52) U.S. Cl.
CPC ............ *G01G 23/166* (2013.01); *A47J 36/32* (2013.01); *G01G 3/13* (2013.01); *G01G 19/52* (2013.01)

(58) Field of Classification Search
CPC ........ G01G 3/13; G01G 23/166; G01G 19/52; A47J 36/32
See application file for complete search history.

(56) References Cited

U.S. PATENT DOCUMENTS 3,684,875 A    8/1972  Smith et al.
3,977,484 A    8/1976  Kammerer
(Continued)

FOREIGN PATENT DOCUMENTS

CN    102080837    6/2011
CN    102444914    5/2012
(Continued)

OTHER PUBLICATIONS

International Search Report and Written Opinion dated Jun. 20, 2018 for International Application No. PCT/EP2018/057925 filed Mar. 28, 2018.
(Continued)

*Primary Examiner* — Natalie Huls
(74) *Attorney, Agent, or Firm* — Maschoff Brennan

(57) ABSTRACT

The present invention relates to a sensing and control device (40) and method for a weight measurement device (30) comprising a load unit for loading material to be weighted. To enable precise measurement with less expensive components, said sensing and control device comprises analog circuitry (50) configured to receive a weight measurement signal, convert the received weight measurement signal into a first voltage signal, subtract a second voltage signal representing the weight of at least the load unit without being loaded with material to be weighted from the first voltage signal when the load unit is loaded with material to be weighted to generate a third voltage signal representing the weight of the material to be weighted, and control circuitry (60) configured to receive the first voltage signal while the load unit is not loaded with material to be (Continued)

weighted, convert the first voltage signal into a first digital signal, and generate a pulse width modulated, PWM, signal having a pulse width representing the weight measured by the load unit while not being loaded with material to be weighted, and further configured to convert the third voltage signal into a second digital signal representing the weight measurement of the material to be weighted. The analog circuitry (50) is configured to generate the second voltage signal from the PWM signal generated by the control circuitry, wherein the voltage level of the second voltage signal is proportional to the pulse width of the PWM signal.

14 Claims, 6 Drawing Sheets

(51) Int. Cl.
    *G01G 3/13*     (2006.01)
    *G01G 19/52*     (2006.01)

(56) References Cited

U.S. PATENT DOCUMENTS

| | | | | |
|---|---|---|---|---|
| 6,313,415 | B1* | 11/2001 | Maher | G01G 23/3707 |
| | | | | 177/21 OR |
| 9,582,070 | B2 | 2/2017 | Kadantseva et al. | |
| 2016/0231182 | A1* | 8/2016 | Dai | G01L 19/0092 |
| 2017/0234720 | A1* | 8/2017 | Koller | G01G 7/04 |
| | | | | 177/25.13 |
| 2018/0117553 | A1* | 5/2018 | Lohmann | H05B 3/68 |

FOREIGN PATENT DOCUMENTS

| | | | |
|---|---|---|---|
| CN | 102647104 | | 8/2012 |
| CN | 202364202 | U | 8/2012 |
| CN | 103438972 | A | 12/2013 |
| CN | 104421978 | | 3/2015 |
| CN | 105088608 | | 11/2015 |
| CN | 105725736 | A | 7/2016 |
| EP | 1622059 | | 2/2006 |
| EP | 2540199 | | 1/2013 |
| GB | 2219659 | A * | 12/1989 ............ G01G 3/145 |
| JP | 2015038428 | | 2/2015 |
| RU | 1830463 | A1 | 7/1993 |
| RU | 2186347 | C1 | 7/2002 |
| WO | 2016028921 | | 2/2016 |

OTHER PUBLICATIONS

"Electrical Engineer Manual", Editorial Board of Mechanical Engineering Manual, pp. 1, Dec. 31, 1987.

* cited by examiner

SENSING AND CONTROL DEVICE AND METHOD FOR A WEIGHT MEASUREMENT DEVICE

CROSS REFERENCE TO RELATED APPLICATIONS

This application is the U.S. National Phase application under 35 U.S.C. § 371 of International Application No. PCT/EP2018/057925 filed Mar. 28, 2018, published as WO 2018/178155 on Oct. 4, 2018, which claims the benefit of European Patent Application Number 17170406.7 filed May 10, 2017 and Application Number PCT/CN2017/000276 filed Apr. 1, 2017. These applications are hereby incorporated by reference herein.

FIELD OF THE INVENTION

The present invention relates to a sensing and control device and method for a weight measurement device comprising a load unit for loading material to be weighted. The present invention relates further to a weight measurement device and a cooking device.

BACKGROUND OF THE INVENTION

Nowadays, a trend in home kitchen appliances is to automate the cooking processes to free consumers from lengthy waiting times, intervention and failed outcome. Monitoring weight change of food during cooking has been proven as a good indicator of food doneness status in many dry cooking methods (e.g. grill, roast, bake, frying, etc.). This is often realized with some load gauge arrangement (or, more generally, a weight measurement device comprising a load unit into which material to be weighted can be loaded) to transduce the gravity to electrical signal, which is amplified to match the range of an analog-to-digital converter (ADC) given by the reference voltage and then quantified by ADC to digital data and fed to a control unit (e.g. a microcontroller unit, MCU) for computation.

EP2540199A1 discloses that an electric heating cooker with weighing function and a weighing control method thereof are provided. An electronic scale with weighing function is added under the traditional electric heating cooker and stores cooking experience database and food information database. It solves the problem that users aren't accurate about the amount of water to add for a given weight of ingredient. And experience curve of heating power are designed at different weight points for food such as rice or meat, and also it makes the cooker to intelligently adjust parameters according to the taste feedback of the user so as to be more closer to the user's taste for the cooking next time; additionally it is capable of showing the total and average content of heat quantity, cholesterol, protein, fat, salt and cook oil of various foods in current cooking or if there are unmatched foods.

In practise, it is difficult to configure a load gauge arrangement to directly weigh the food, but instead it often is configured to weigh a cooking vessel or even the whole cooking appliance including the food. Meanwhile, high-end appliances have also become capable of handling more food at a faster speed and with a more optimal outcome by integrating multiple cooking functions (e.g. microwave, steaming, radiant, convective heating and stirring), using more powerful parts and having larger capacitance, a trend making the devices much heavier than earlier devices and also the cooked food itself. In order to accurately measure the weight change of food it is thus needed to either reduce the load other than food on the load gauge arrangement or to use a high precision ADC with a larger dynamic range to cover the total weight of both the load unit (or even the complete weight measurement device) and the food. Reducing the load requires either complicate mechanical isolation or placing the load gauge arrangement closer to the food but also closer to the harsh cooking environment, which may interfere with the sensing accuracy. Using a high precision ADC with a larger dynamic range is actually the common practice at present for its simplicity but with the expensive ADC increasingly wasted on the growing weight of today's appliances.

Hence, there is a need to provide a solution that only quantifies the effective portion of the load (i.e. the material to be weighted that is held in the load unit), in particular to provide a solution that enables measuring the weight change of the food during cooking so that even a low cost ADC (usually available as an integrated unit of an MCU but with lower bit depth) can handle the required range and precision for monitoring the cooking status of the food.

SUMMARY OF THE INVENTION

It is an object of the present invention to provide a sensing and control device and method for a weight measurement device comprising a load unit for loading material to be weighted that enable the use of a low cost ADC but still enables a precise measurement of the material, e.g. food during an automated cooking process. The present invention relates further to a corresponding weight measurement device and a corresponding cooking device.

In a first aspect of the present invention a sensing and control device is presented comprising:

analog circuitry configured to receive a weight measurement signal, convert the received weight measurement signal into a first voltage signal, subtract a second voltage signal representing the weight of at least the load unit without being loaded with material to be weighted from the first voltage signals when the load unit is loaded with material to be weighted to generate a third voltage signal representing the weight of the material to be weighted, and control circuitry configured to receive the first voltage signal while the load unit is not loaded with material to be weighted, convert the first voltage signal into a first digital signal, and generate a pulse width modulated, PWM, signal having a pulse width representing the weight measured by the weight measurement device while the load unit is not loaded with material to be weighted, and further configured to (optionally amplify and) convert the third voltage signal into a second digital signal representing the weight measurement of the material to be weighted, wherein the analog circuitry is configured to generate the second voltage signal from the PWM signal generated by the control circuitry, wherein the voltage level of the second voltage signal is proportional to the pulse width of the PWM signal.

In a further aspect of the present invention a weight measurement device is presented comprising:

a load unit configured to load material to be weighted, a load measurement unit configured to measure the weight of the material and to provide a weight measurement signal, and a sensing and control device as disclosed herein configured to generate a digital signal representing the weight measurement of the material to be weighted based on the weight measurement signal.

In a further aspect of the present invention a cooking is presented comprising:
a weight measurement device as disclosed herein and
a heating unit configured to heat the food held in the load unit of the weight measurement device.

In still another aspect of the present invention a sensing and control method for a weight measurement device comprising a load unit for loading material to be weighted is presented, said sensing and control method comprising:
receiving a weight measurement signal,
converting the received weight measurement signal into a first voltage signal,
converting the first voltage signal while the load unit is not loaded with material to be weighted into a first digital signal,
generating a pulse width modulated, PWM, signal having a pulse width representing the weight measured by the weight measurement device while the load unit is not loaded with material to be weighted,
generating a second voltage signal from the PWM signal generated by the control circuitry, wherein the voltage level of the second voltage signal is proportional to the pulse width of the PWM signal,
subtracting the second voltage signal representing the weight of load unit without being loaded with material to be weighted from the first voltage signals when the load unit is loaded with material to be weighted to generate a third voltage signal representing the weight of the material to be weighted, and
converting (after optionally amplifying) the third voltage signal into a second digital signal representing the weight measurement of the material to be weighted.

In yet further aspects of the present invention, there are provided a corresponding sensing and control method, a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, system, computer program and medium have similar and/or identical preferred embodiments as the claimed sensing and control device, in particular as defined in the dependent claims and as disclosed herein.

The present invention presents a low cost solution for measuring weight change of material, e.g. food during cooking in a large and heavy kitchen appliance, preferably using function modules commonly integrated in an MCU instead of additional discrete devices. In this solution, the load (e.g. mainly the weight of cooking devices and its attachments) on the weight measurement device prior to the loading of the material to be weighted, e.g. food substance, will be recorded and converted proportionally to a DC level based on an integrated PWM arrangement. The DC voltage will be subtracted analogously from the total weight (i.e. the weight of the material and the load unit, in the example of a cooking device measured during cooking). The resulting signal level is (optionally amplified and) fed to the ADC so that the limited effective bits of an integrated ADC can be used to only quantify the weight change of the material instead of being wasted on unchanged parts (such as the load unit) of the total weight. The present invention thus makes weight monitoring e.g. in food processing more cost effective. Generally, the present invention can also be applied generally in a weight measurement device for different applications and in different fields, such as weight measurement devices in pharmacy, chemistry, material science, i.e. generally where precise but inexpensive measurements shall be realized.

In an embodiment said analog circuitry comprises a lowpass filter configured to filter the PWM signal to generate the second voltage signal. The second voltage, which is preferably a DC voltage, thus is the time averaged voltage of the rectangular waveform voltage.

In another embodiment said analog circuitry comprises a PWM driver configured to convert the PWM signal into an optimized PWM signal having a more consistent voltage level and transitions, wherein said analog circuitry is configured to generate the second voltage signal from the optimized PMW signal. The PWM driver thus outputs a rectangular waveform voltage and is generally able to modify the amplitude and the transitions (i.e. edges) of the PWM signal while maintaining the pulse width.

In another embodiment said analog circuitry comprises a first amplifier configured to amplify the first voltage signal and/or a second amplifier configured to amplify the third voltage signal. This provides that the available sensitivity of subsequent components is fully exploited.

In another embodiment said analog circuitry comprises a subtraction unit configured to subtract the second voltage signal from the first voltage signal. The output of the subtraction unit is the third voltage signal, preferably a DC voltage that is proportional to the weight of the material to be weighted.

Said analog circuitry may further comprise a differential amplifier configured to receive a DC voltage signal representing the weight measurement signal. The weight measurement signal may e.g. be output from a measurement bridge, such as a load cell measurement bridge.

In an embodiment the control circuitry is configured to select either the first voltage signal or the third voltage signal for analog-to-digital conversion into the first digital signal and the second digital signal, respectively. Preferably, for this purpose a multiplexer is provided.

Preferably, the control circuitry comprises a memory configured to store the first digital signal, a counter configured to convert the first digital signal into a pulse width of a rectangular waveform and/or a PWM generator configured to generate the PWM signal.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

The following description explains the present invention with reference to an application in a cooking device, to which the present invention is, however, not limited.

Figure 1A:
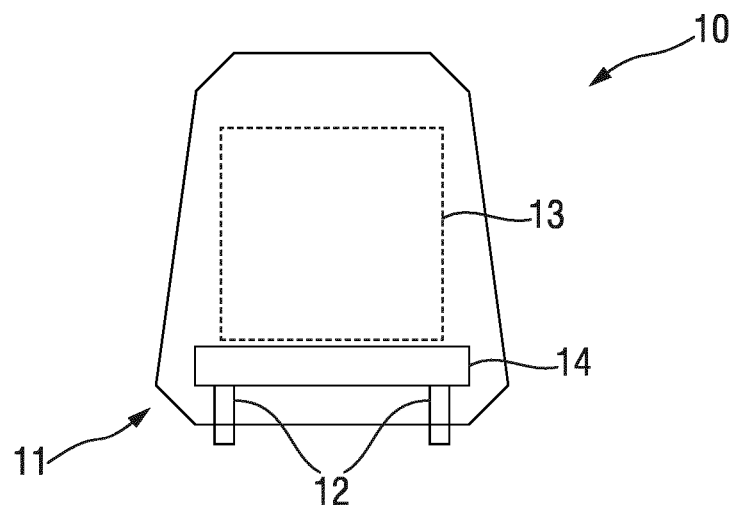
FIG. 1A shows a schematic diagram of a conventional cooking device.

FIG. 1A shows a schematic diagram of a conventional cooking device 10. In a common implementation of the weighing function in such a cooking device 10 the weight measurement device 11 comprising load gauges 12 (in general a load measurement unit comprising one or more load measurement elements such as load gauges or load cells) is arranged at the bottom of the cooking device 10. The weight measurement device 11 thus measures the whole cooking device 10 including the cooked food arranged in a load unit 13, which in this embodiment is a compartment of the cooking device 10, to stay away from the harsh cooking environment. The cooking device 10 further comprises a sensing and control device 14, which is shown in more detail in FIG. 1B. According to this embodiment the sensing and control device 14 is coupled to the load gauges 12 via a measurement bridge 15 and comprises a differential amplifier 16, an amplifier 17, an analog-to-digital converter (ADC) 18 and a control unit (MCU) 19.

The arrangement of the weight measurement device 11 at the bottom of the cooking device 10 means that not only the load gauge 12, the measurement bridge 15 and the sensing and control device 14 need to cover the range of the total weight, which contains a large portion of 'dead weight' irrelevant to the sensing purpose (status monitoring and control), but also the ADC 18 needs to have a greater bit depth to resolve the large number of divisions for the required precision, which also most of them are wasted on the weight of the at least the load unit 13 or even the complete cooking device 10.

For an air fryer of 7000 g, as an example, to cook food a load of maximally 500 g and a 1 g precision is desired. When the whole weight is measured and quantified, at least 7500/1=7500 divisions are needed to resolve 1 g, which need 13 ($2^{13}$=8192) effective bits in the ADC 18. As a matter of fact, in an ADC application, there are several non-linear effects that decrease the effective number of bits by at least 1-2 bits. Hence, to achieve 13 effective bits, a more expensive 14/15-bit ADC may be used either by upgrading to an upper tier MCU with such an ADC or adding a discrete ADC. However, the change that is really cared about is 1 g change within 500 g range, which only needs 500 divisions or 9 ($2^9$=512) effective bits thus can be handled by a 12-bit ADC with safe margin commonly integrated in a MCU of a lower tier.

This suggests to subtract the large 'dead' weight of the cooking device (and its possible attachment) as an offset from the analogous output of the load gauge, so that only the 'active' weight of the cooked food is fed to the ADC, i.e. so called 'analogous taring'. But there are still problems to be solved:

i) The dead weight is not absolutely constant, but affected by things like attachments (grill pan, gridiron, baskets) and stress on a power cord, which may be substantial compared with the food weight and requires a range and resolution margin (e.g. one more bit) to be reserved at cost if only a fixed offset is subtracted analogously while other semi-active load has to be tarred digitally. To count for the semi-active but irrelevant load (change with settings but static during one cooking session), the actual 'inactive' load as whole may be measured before food loading at the beginning of each cooking session and subsequently subtracted from the analogous signal in front of the ADC.

ii) The inactive load may be stored and subsequently converted to an analogous signal to be subtracted for 'analogous active taring'. However, unlike analog-to-digital conversion, even non-precise digital-to-analog conversion is commonly not an integrated unit of MCU and may need to be built using discrete parts at significant cost. Hence, the present invention provides a solution that preferably uses common integrated units in an MCU for 'analogous active taring' in weighing during cooking, thus maximizing the cost-efficiency of the cooking device.

Figure 2:
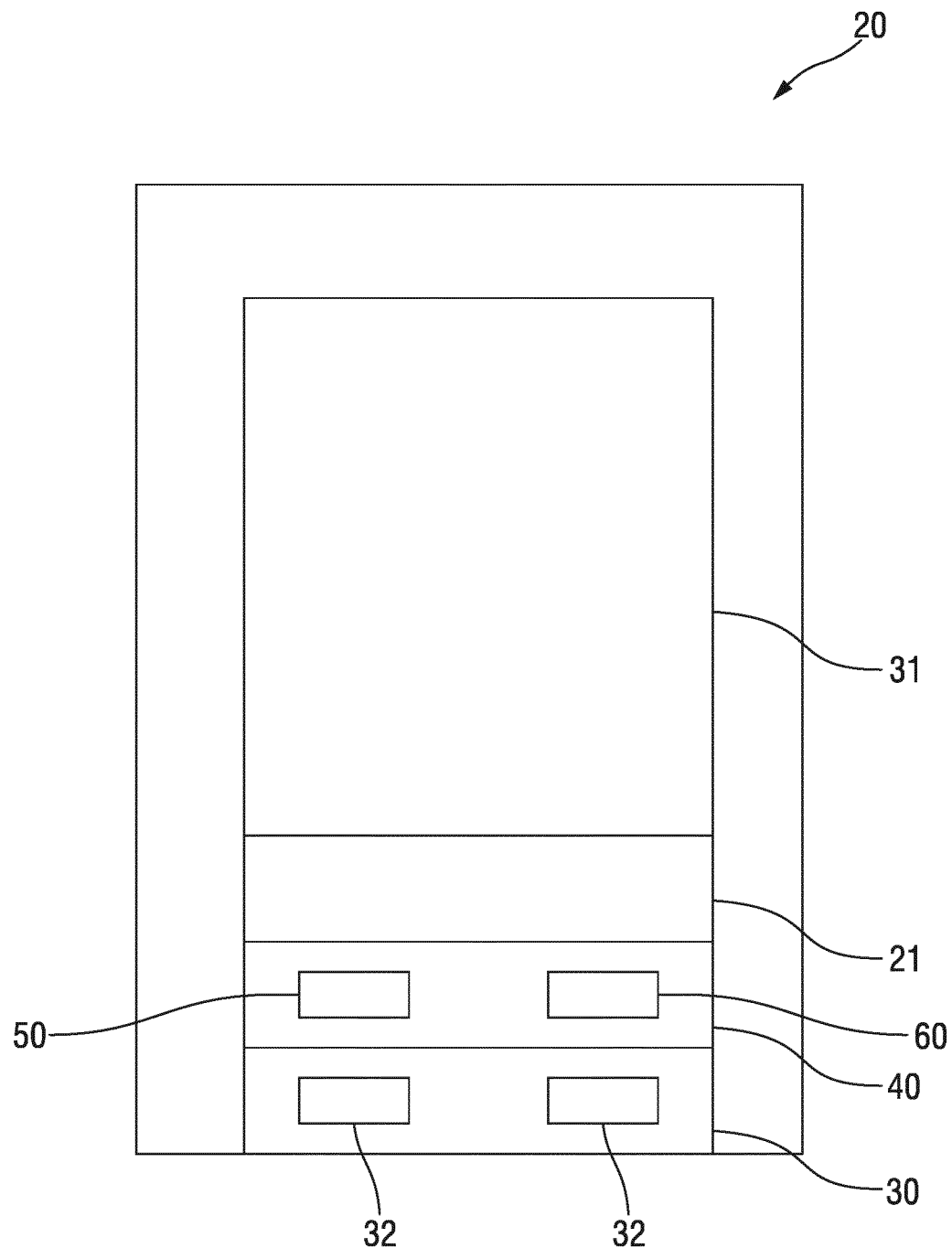
FIG. 2 shows a schematic diagram of a cooking device according to the present invention including a weight measurement device and a sensing and control device according to the present invention.

FIG. 2 shows a schematic diagram of a cooking device 20 according to the present invention including a weight measurement device 30 and a sensing and control device 40 according to the present invention. The cooking device 20 comprises the weight measurement device 30 and a heating unit 21 configured to heat the food held in a load unit 31 of the weight measurement device 30. The load unit 31 may e.g. be configured as separate container or as compartment of the cooking device 20, in this embodiment e.g. as a food holder.

The weight measurement device 30 or the cooking device comprises the load unit 31 configured to load material, i.e. the food in this embodiment, to be weighted and a load measurement unit 32, e.g. a load gauge or load cell arrangement, configured to measure the weight of the material and to provide a weight measurement signal. The load measurement unit 32 is placed at the bottom of or below the cooking device 20 or of the vertically isolated load unit 31 so that the total or part of the weight of the cooking device plus the weight of the food will be weighed during cooking. The weight measurement device 30 further comprises a sensing and control device 40 configured to generate a digital signal representing the weight measurement of the material to be weighted based on the weight measurement signal.

The sensing and control device 40 generally performs steps like signal readout, processing, conversion and recording, computation and controlling. The sensing and control device 40 mainly includes two parts referred to as analog circuitry 50 and control circuitry 60.

The analog circuitry 50 is configured to receive a weight measurement signal, convert the received weight measurement signal into a first voltage signal, subtract a second voltage signal representing the weight of at least the load unit without being loaded with material to be weighted from the first voltage signals to generate a third voltage signal representing the weight of the material to be weighted.

The control circuitry 60 is configured to receive the first voltage signal while the load unit is not loaded with material to be weighted, convert the first voltage signal into a first digital signal, and generate a pulse width modulated, PWM, signal having a pulse width representing the weight measured by the weight measurement device while the load unit is not loaded with material to be weighted, and further configured to convert the third voltage signal into a second digital signal representing the weight measurement of the material to be weighted.

Figure 3:
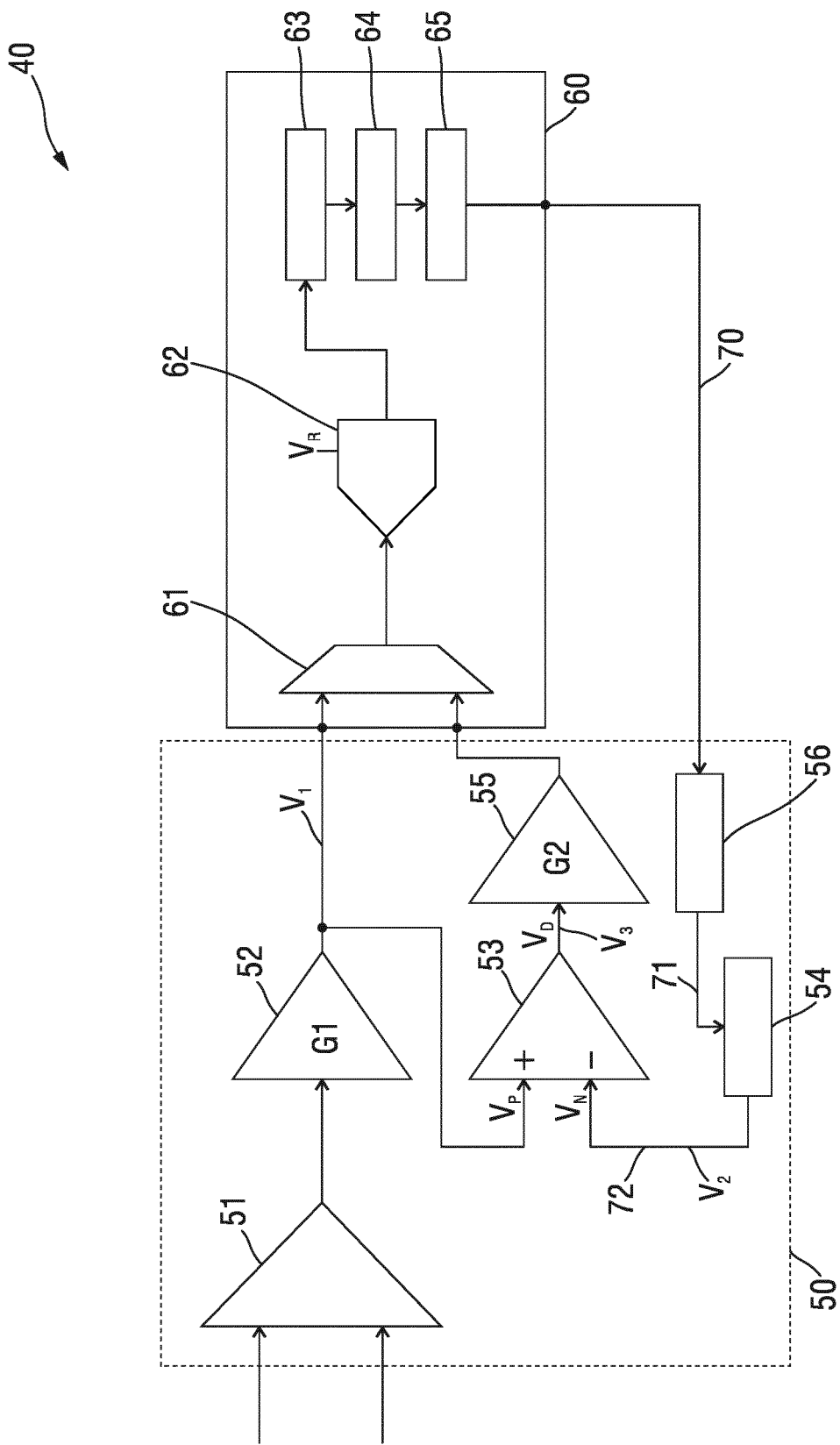
FIG. 3 shows a schematic diagram of more details of an embodiment of a sensing and control device according to the present invention.

The analog circuitry 50 is further configured to generate the second voltage signal from the PWM signal generated by the control circuitry, wherein the voltage level of the second voltage signal is proportional to the pulse width of the PWM signal. FIG. 3 shows a schematic diagram of more details of an embodiment of a sensing and control device 40 according to the present invention.

A load gauge 32, e.g. an arrangement of piezo-resistive or piezo-electric devices, with maximal load rated greater than the total weight of the weight measurement device (or, more likely, the whole cooking device 20 including its attachments but not excluding the case that only part of the cooking device which holds the food and is mechanically isolated from rest of the cooking device in vertical direction) before food loading (denoted as $W_A$) and the maximal food load (denoted as $W_{F-M}$) of the cooking device. The load gauge is strained by the gravity of the load which causes proportional changes in its electric resistance or charges.

Figure 1B:
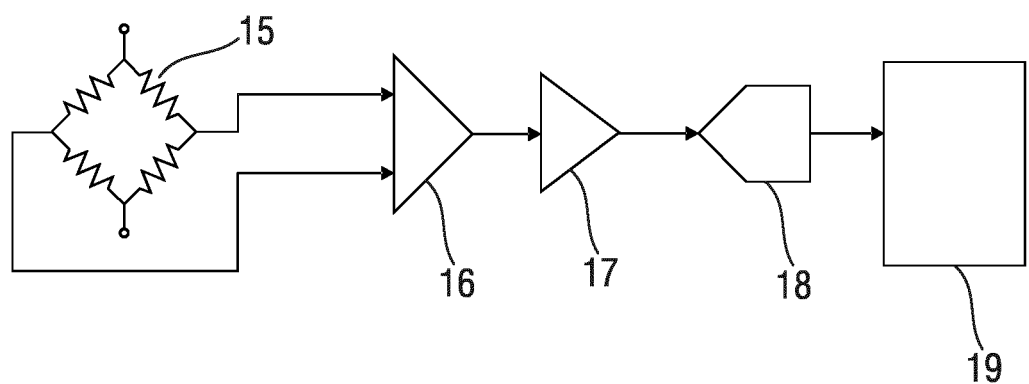
FIG. 1B shows a schematic diagram of a conventional sensing and control device.

The load gauge 32 may be connected in a circuit (e.g. a bridge circuit 15 as shown in FIG. 1B for better sensitivity) that outputs a DC voltage signal (usually a differential voltage between the diagonal of the bridge circuit 15 thus is converted to a voltage with respective to the ground for subsequent processing) in proportion to the resistance or capacitance change thus also to the loaded gravity in total.

The gauge output voltages, representing a weight measurement signal S, are amplified by a total gain of G1 using a first amplifier 52 to obtain a first voltage signal V1. The gain G1 may include the gain of the differential amplifier 51 (which receives the output of the bridge circuit 15), if that is not unity) before being fed to positive input $V_P$ of a subtraction unit 53. The negative input $V_N$ of the subtraction unit 53 is fed with a second DC voltage V2. $V_P$ and $V_N$ are in the same proportion to $W_A+W_F$ and $W_A$, respectively. Hence, the output $V_D$ of the subtraction unit 53, representing a third voltage signal V3, is proportional to the difference between $V_P$ and $V_N$ and thus to the gravity of food, $W_F$.

In this embodiment $V_N$ is originated from a digital-to-analog converter (DAC) 54, whose digital input is a binary quantification of the gravity of 'inactive load', $W_A$, weighed before food loading and is stored in a memory 63 of the control circuitry 60. The DAC 54 with high precision, in this embodiment, is realized by a low pass filtering a rectangular waveform to a DC voltage. The duty cycle ratio (or pulse width) of the rectangular waveform is controlled by a counter 64 (i.e. a pulse width modulation). The count is the binary record of $W_A$ loaded from the memory 63. The rectangular waveform generator (or PWM generator) 65 is a part commonly integrated in main stream control circuitry with no additional cost imposed. Optionally, the DAC 54 can also be an integral device (e.g. a DAC IC chip) or constructed using discrete parts in a cascaded architecture but at higher cost.

To gain greater sensitivity for the target food weight, $V_D$ may be further scaled by a second amplifier 55 with a gain G2 (which may include the gain of the subtraction unit 53, if that is not unity) according to the reference voltage $V_R$ of an ADC 62 to $(W_F/W_{F-M})·A·V_R$ before being fed to the analogous input of the ADC 62. Here, A is the predetermined fraction of the full scale of the ADC 62. Hence, in an ADC 62 of N bits, the gravity ($W_{F-M}$) of maximal food load will be quantified to $A·2^N$ in binary, and the actual food load of $W_F$ will be quantified to $(W_F/W_{F-M})·A·2^N$ in binary, so that the resolution is $W_{F-M}/(A·2^N)$. When the effective bit depth $N_E$ is less than N, the effective resolution increases to $W_{F-M}/(A·2^{NE})$.

For example, if a low cost integrated 12 bit ADC 62 has only 10 effective bits and is fully used (A=1) to cover maximally 500 g food load ($W_{F-M}$=500 g), then the effective resolution is 500/1024≈0.5 g, which is often precise enough for monitoring food weight during cooking.

Therefore, there are two weights ($W_A$ vs. $W_F$, and $W_A \gg W_F$) of greatly different magnitudes that shall be digitalized. This may be solved economically in an embodiment with a multiplexer 61 commonly integrated in front of the ADC 62 in the control circuitry 60. One of the inputs of the multiplexer 61 is connected to the output of first amplifier 52 of gain G1 and the other input of the multiplexer 61 is connected to the output of second amplifier 55 of gain G2, where G1 will scale a relative greater voltage, $V_P$, representative largely of $W_A$ to match the full scale of $A·V_R$ in the ADC 62, while G2 will scale a relative smaller signal of $V_D$ representing maximally $W_{F-M}$ to match the full scale of $A·V_R$.

To make this solution work properly for food weight monitoring during cooking, a vacant cooking device with gravity of $W_A$ (including the food) is weighed before food loading and quantified digitally and stored in memory 63. At this moment, voltage $V_P$ should be substantially equal to voltage $V_N$, leaving the difference $V_D$ as close to zero as possible. $V_N$, the output DC voltage of the lowpass filter 54, is proportional to the time averaged voltage of the rectangular waveform, which is the product of the duty cycle ratio R and the 'ON' amplitude $V_{On}$, i.e. $V_N=R·V_{On}$. $R=T_{on}/T$, where T is the repeating period of the rectangular waveform and $T_{on}$ is the duration of 'ON' pulse and controlled by the counter number loaded from the memory 63, which is the digital representative of $W_A$.

Figure 4:
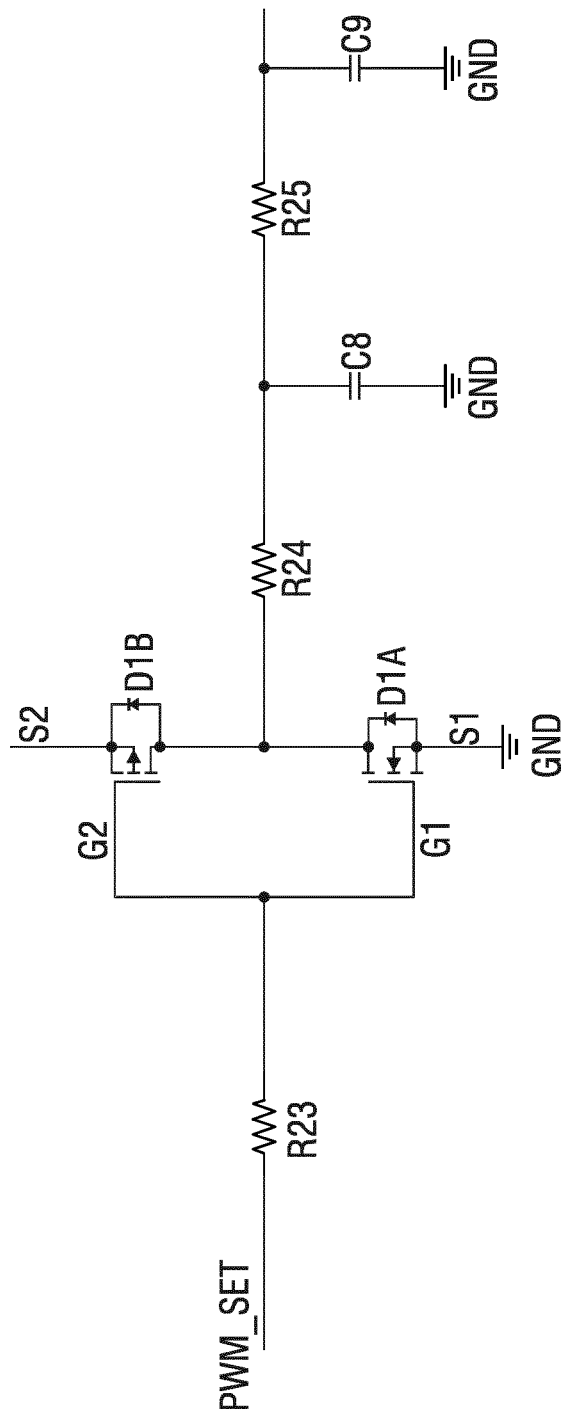
FIG. 4 shows a circuit diagram of an embodiment of a PWM driver.
Figure 5:
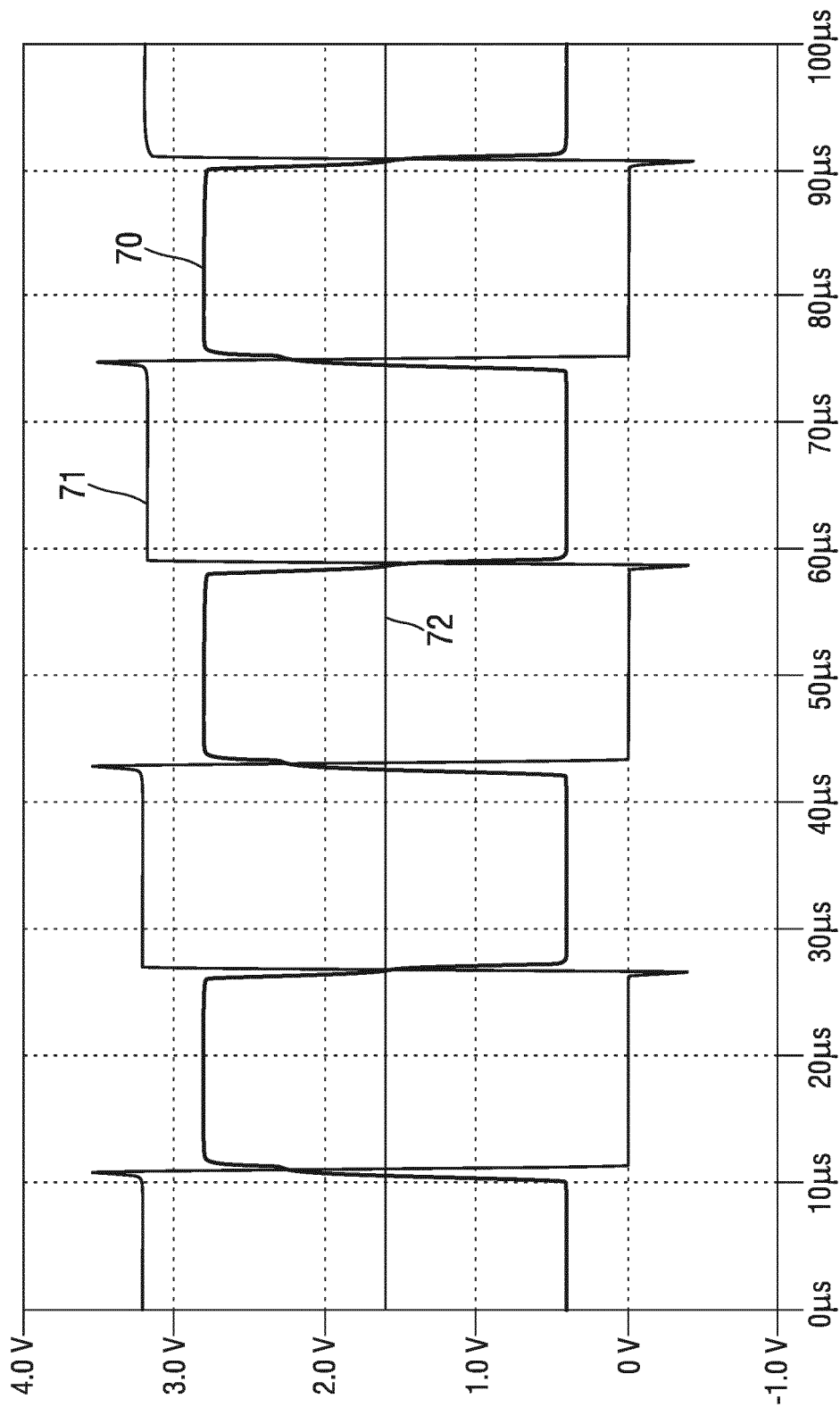
FIG. 5 shows signal diagram of the input signal and the output signal of a PWM driver.

Since the digital voltage of the 'ON' and 'OFF' output from the control circuitry 60 represents the digital logic status rather than a precise and constant voltage value, a driver circuit 56, e.g. a PWM driver, may be added in front the filter circuit 54. The driver circuit 56, as shown in an embodiment in FIG. 4 comprises a pair of cheap MOSFETs of opposite types with their gate terminals connected together with the PWM output of the control circuitry 60, their drain terminals connected together with the input of the filter circuit 54, and their source terminals connected to the analogous positive supply $V_R$ and ground, respectively. The circuitry shown in FIG. 4 is given as an example of a simple two stage RC low-pass filter, but is not limited to this form. Thus the 'ON' voltage of PWM output will switch the P and N type MOSFET to short and open status respectively, and pull the drain terminal to $V_R$, while the 'OFF' voltage will do the opposite and pull the drain terminal to zero voltage, thus achieve more precise and consistent voltage value in PWM as shown by simulation result depicted in FIG. 5. In the simulation, peak-to-peak fluctuation of the filtered PWM, i.e. $V_N$, is less than $1/2^{17}$ of $V_R$ (assuming it is the same reference voltage for ADC), a disturbance totally ignorable for the performance. FIG. 5 particularly shows the digital PWM output 70 from the control circuitry 60, the PWM output 71 from the PWM driver 56, and the DC voltage output 72 after filtering.

Hence, according to the present invention the first voltage signal is converted from the received weight measurement signal and could represent either the weight of vessel only or that of vessel and food material, depending on whether the material is being loaded or not. Specifically, the first voltage signal could represent the weight of vessel while there is no material being loaded. The first voltage signal while no material is being loaded onto the load unit is specifically used to calculate the second voltage signal. And the first voltage signal could also represent the total weight of vessel and food material when the material is being added onto the load unit. In this case, the first voltage while the material is being added can be used to calculate the third voltage signal.

Figure 6:
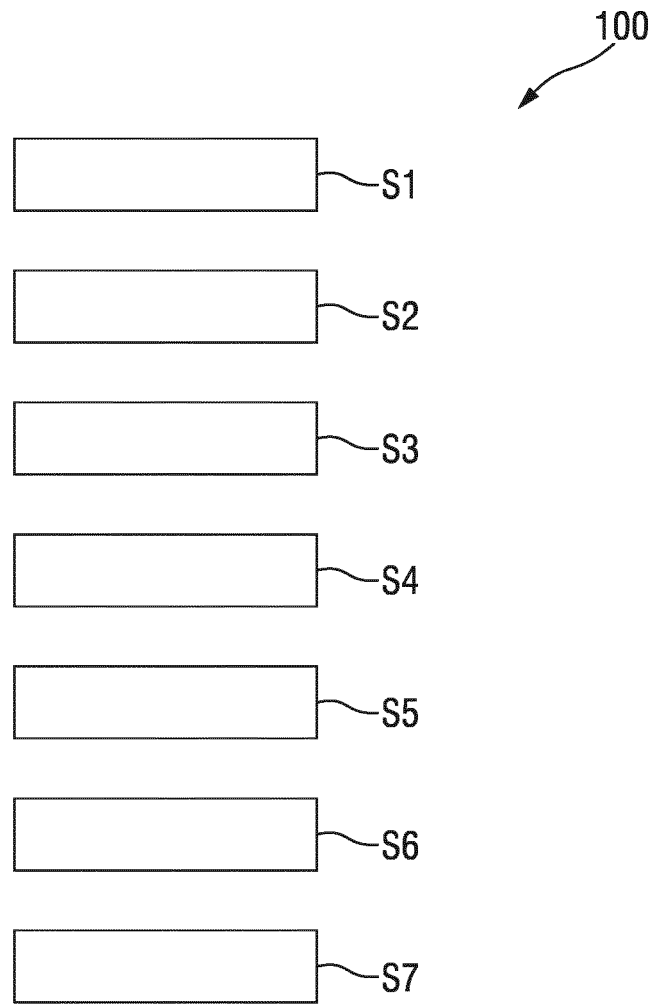
FIG. 6 shows a flow chart of a sensing and control method according to the present invention.

FIG. 6 shows a flowchart of a method sensing and control method 100 according to the present invention for a weight measurement device comprising a load unit for loading material to be weighted. Said sensing and control method 100 comprises the following steps:

S1: receiving a weight measurement signal.

S2: converting the received weight measurement signal into a first voltage signal.

S3: converting the first voltage signal while the load unit is not loaded with material to be weighted into a first digital signal.

S4: generating a pulse width modulated, PWM, signal having a pulse width representing the weight measured by the weight measurement device while the load unit is not loaded with material to be weighted.

S5: generating a second voltage signal from the PWM signal generated by the control circuitry, wherein the voltage level of the second voltage signal is proportional to the pulse width of the PWM signal.

S6: subtracting a second voltage signal representing the weight of at least the load unit without being loaded with material to be weighted from the first voltage signal when the load unit is loaded with material to be weighted to generate a third voltage signal representing the weight of the material to be weighted.

S7: converting the third voltage signal into a second digital signal representing the weight measurement of the material to be weighted.

The present invention can be applied in any weight solution, e.g. for cooking status monitoring, that analogously tares the inactive weight of the part of or the whole device, e.g. cooking device, from the total weight to get the target material (food) weight that is active during operation (e.g. cooking), particularly in that the inactive weight taken before material loading is stored and encoded in a pulse waveform. The invention is preferably applied in weighing based or assisted cooking status monitoring in home or business kitchen applications.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A sensing and control device for a weight measurement device comprising a load unit for loading material to be weighted, wherein said sensing and control device comprises:

an analog circuitry configured to receive a weight measurement signal from a weight measurement unit, convert the received weight measurement signal into a first voltage signal, subtract a second voltage signal, representing weight of at least the load unit without being loaded with material to be weighted, from the first voltage signal, representing weight of at least the load unit loaded with material to be weighted, to generate a third voltage signal representing weight of the material to be weighted, and a control circuitry configured to receive the first voltage signal while the load unit is not loaded with material to be weighted from the analog circuitry, convert the first voltage signal into a first digital signal, and generate a pulse width modulated (PWM) signal having a pulse width representing weight measured by the weight measurement device while the load unit is not loaded with material to be weighted, and further configured to convert the third voltage signal into a second digital signal representing weight measurement of the material to be weighted, wherein the analog circuitry is configured to generate the second voltage signal from the PWM signal generated by the control circuitry, and wherein a voltage level of the second voltage signal is proportional to the pulse width of the PWM signal.

2. The sensing and control device as claimed in claim 1, wherein said analog circuitry comprises a lowpass filter configured to filter the PWM signal to generate the second voltage signal.

3. The sensing and control device as claimed in claim 1, wherein said analog circuitry comprises a PWM driver configured to convert the PWM signal into an optimized PWM signal, and wherein said analog circuitry is configured to generate the second voltage signal from the optimized PWM signal.

4. The sensing and control device as claimed in claim 1, wherein said analog circuitry comprises at least one of a first amplifier configured to amplify the first voltage signal and a second amplifier configured to amplify the third voltage signal.

5. The sensing and control device as claimed in claim 1, wherein said analog circuitry comprises a subtraction unit configured to subtract the second voltage signal from the first voltage signal.

6. The sensing and control device as claimed in claim 1, wherein said analog circuitry comprises a differential amplifier configured to receive a DC voltage signal representing the weight measurement signal.

7. The sensing and control device as claimed in claim 1, wherein said control circuitry is configured to select at least one of the first voltage signal and the third voltage signal for analog-to-digital conversion into the first digital signal and the second digital signal, respectively.

8. The sensing and control device as claimed in claim 1, wherein said control circuitry comprises a multiplexer configured to select at least one of the first voltage signal and the third voltage signal for analog-to-digital conversion into the first digital signal and the second digital signal, respectively.

9. The sensing and control device as claimed in claim 1, wherein said control circuitry comprises a memory configured to store the first digital signal.

10. The sensing and control device as claimed in claim 1, Wherein said control circuitry comprises at least one of a counter configured to convert the first digital signal into a pulse width of a rectangular waveform and a PWM generator configured to generate the PWM signal.

11. A weight measurement device, comprising:
a load unit configured to load material to be weighted,
a load measurement unit configured to measure weight of the material and to provide a weight measurement signal, and
the sensing and control device, as defined in claim 1, configured to generate a digital signal representing weight measurement of the material to be weighted based on the weight measurement signal.

12. A cooking device, comprising:
the weight measurement device as claimed in claim 11, and
a heating unit configured to heat food held in the load unit of the weight measurement device.

13. A sensing and control method for a weight measurement device comprising a load unit for loading material to be weighted, wherein said sensing and control method comprises:
receiving a weight measurement signal from a weight measurement device,
converting the received weight measurement signal into a first voltage signal,
converting the first voltage signal while the load unit is not loaded with material to be weighted into a first digital signal,
generating a pulse width modulated (PWM) signal having a pulse width representing weight measured by the weight measurement device while the load unit is not loaded with material to be weighted,
generating a second voltage signal from the PWM signal generated by the control circuitry, wherein the voltage level of the second voltage signal is proportional to the pulse width of the PWM signal,
subtracting the second voltage signal, representing weight of at least the load unit without being loaded with material to be weighted, from the first voltage signal, representing weight of at least the load unit loaded with material to be weighted, to generate a third voltage signal representing weight of the material to be weighted, and
converting the third voltage signal into a second digital signal representing weight measurement of the material to be weighted.

14. A non-transitory computer readable storage medium having stored thereon a computer program comprising program code means for causing a computer to carry out the steps of the method, as claimed in claim 13, when said computer program is carried out on the computer.

* * * * *